United States Patent

Fefferman

[15] 3,653,946

[45] Apr. 4, 1972

[54] METHOD OF DEPOSITING AN ADHERENT GOLD FILM ON THE SURFACES OF A SUITABLE SUBSTRATE

[72] Inventor: Gerald B. Fefferman, Parsippany, N.J.

[73] Assignee: Bell Telephone Laboratories, Incorporated, Berkeley Heights, N.J.

[22] Filed: Sept. 30, 1969

[21] Appl. No.: 862,481

[52] U.S. Cl. ....................117/46 CA, 117/124 A, 117/124 B, 117/124 C, 117/124 D, 117/169 R, 117/160 R, 117/227, 204/38 B

[51] Int. Cl. ....................................C03c 17/10, B44d 1/18

[58] Field of Search ...........117/46 CA, 124 A, 124 B, 124 D, 117/124 C, 169, 160 R, 227; 264/61, 62; 204/109

[56] References Cited

UNITED STATES PATENTS

| | | | |
|---|---|---|---|
| 2,440,691 | 5/1948 | Jira | 117/46 CA |
| 3,313,632 | 4/1967 | Langley et al. | 117/124 R |
| 2,593,817 | 4/1952 | Waggoner | 117/46 CA |
| 3,284,225 | 11/1926 | Smock et al. | 117/46 CA |
| 2,842,457 | 7/1958 | Morgan et al. | 117/46 CA |
| 3,149,002 | 9/1969 | Place et al. | 117/46 CA |
| 2,950,996 | 8/1960 | Place et al. | 117/46 CA |

*Primary Examiner*—William D. Martin
*Assistant Examiner*—M. Sofocleous
*Attorney*—R. J. Guenther and Edwin B. Cave

[57] ABSTRACT

An adherent gold film is formed on a suitable substrate by the decomposition of organic resinates. A gold resinate is combined with at least two resinates selected from the group consisting of lead resinate, silicon resinate and boron resinate which, upon decomposition in air or an oxidizing atmosphere, form inorganic oxides. The resinate mixture is applied to the substrate and the substrate is fired to a temperature sufficient to (1) decompose the resinate mixture to form free gold and the inorganic oxides, (2) combine the inorganic oxides in situ on the surfaces of the substrate and (3) combine the free gold with the combined oxides to form an adherent gold layer containing 90 to 98 percent by weight of gold. Additional gold may be electrolytically deposited on the substrate to obtain a film of the desired thickness.

6 Claims, No Drawings

METHOD OF DEPOSITING AN ADHERENT GOLD FILM ON THE SURFACES OF A SUITABLE SUBSTRATE

GOVERNMENT CONTRACT

The invention herein claimed was made in the course of, or under contract with the Department of the Army.

BACKGROUND OF THE INVENTION

This invention relates to a method for depositing an adherent gold film on the surface of a suitable substrate, and, more particularly, to depositing a continuous adherent gold film in situ by admixing a gold resinate with other organic resinates and decomposing the resultant mixture.

DESCRIPTION OF THE PRIOR ART

In the preparation of gold coated substrates, the application of the gold to the surfaces of electrically nonconductive substrates has usually been carried out using vacuum deposition techniques. An adherent metallic layer, e.g., chromium, is evaporated in vacuum on the surface of the sample. Following the deposition of this adherent layer, a thin film of gold is vacuum-evaporated upon this adherent layer. The sample is then placed in a standard gold plating bath and the gold film is suitably built up. Unfortunately, this procedure has not proven to be entirely satisfactory in that chromium migrates by diffusion phenomena into the gold layer, so leading to alloying and the concomitant loss of adhesion and decrease in conductivity. A galvanic cell effect can also take place, resulting in poor corrosion resistance under high humidity conditions.

Deposition of gold on nonconductive substrates can also be achieved by applying the gold in the form of an organic resinate. The gold resinate is applied to the substrate and the substrate is then fired to decompose the resinate and form a free gold film. However, the gold film which forms on the substrate is not very adherent and can be peeled away from the substrate, especially after additional gold has been electroplated upon the original gold film.

In U.S. Pat. No. 2,950,996, issued Oct. 30, 1960, a noble metal resinate, such as a gold resinate, is combined with a finely ground glass and at least one complex metal-oxide semiconductor and the mixture is applied to a suitable substrate. The substrate is then heated to decompose the resinate to form a resistive material. The resistive material, however, comprises a ceramic or a silicate glass having colloidal particles of metal and oxide semiconductors dispersed throughout the glass, with the glass being the predominant portion and the metal being a relatively small portion. Unfortunately, this procedure results in a discontinuous metallic layer or a dispersion rather than a continuous conductive metallic film or layer.

In accordance with the present invention a technique is described for the deposition of a continuous adherent gold film on suitable substrate members by means of an inorganic bonding agent formed in situ during the decomposition of a mixture of organic resinates. More particularly, gold in the form of an organic resinate is physically admixed with decomposable inorganic oxide-forming organic resinates to form an organic resinate mixture. The resultant mixture is then applied to the substrate in any suitable manner whereupon the substrate is heated in air or an oxidizing atmosphere to a temperature which is sufficient to decompose the resinate mixture to form free gold and inorganic oxides. The inorganic oxides combine in either a crystalline or amorphous state and the resultant combination is incorporated with the free gold to form an adherent gold film upon the surface of the substrate.

DETAILED DESCRIPTION

The materials selected for use in the practice of the present invention will now be given.

The substrate member chosen may be selected from among those materials normally utilized in thin film and integrated circuitry and should be capable of withstanding temperatures to which it will be subjected during the deposition stages of the process. All types of refractory materials such as glass, ceramics and high melting metals meet this requirement.

The source of the gold employed herein is a gold resinate which is physically admixed with other metallic resinates, e.g., lead resinate, sodium resinate, and/or metalloidal resinates, e.g., boron resinate, silicon resinate, to yield a resinate mixture. The term resinate may be defined as any salt or ester of a resin acid or a mixture of such acids. Under this general class of compounds are included constituents of natural occurring resinates, resin extrudations from trees and synthetic preparations.

In preparing the metallic and metalloidal resinates, the metal or metalloid is substituted into or added to the organo resinates. The metals may be selected from the group 1A, 2A, 2B to 7B, and 8 elements of the Periodic Table of the Elements as reproduced at page B2 of the Handbook of Chemistry and Physics, 45 edition, 1964–1965, published by the Chemical Rubber Company. The metalloids may be selected from group 3A to 6A elements of the Periodic Table of the Elements as reproduced at page B2 of the Handbook of Chemistry and Physics, 45th edition, 1964–1965, published by the Chemical Rubber Company.

Practical considerations dictate the use of a suitable solvent or thinner as a medium for carrying the resinate and the resultant resinate mixture so that the said resinate mixture can be evenly distributed or dispersed in an even coating on the surfaces of the substrate selected. The thinner may be a simple organic solvent such as toluene, but usually the thinner is a mixture of essential oils, terpenes, resins and the like, carefully chosen to impart specific physical properties to the composition. These properties such as oiliness, viscosity, evaporation rate, surface tension and tack will vary for different methods of application. The requisite properties and the solvents or thinners required to produce them are well known to those skilled in the art of making inks, paints and lacquers.

Metallic and/or metalloidal resinates, other than the gold resinate, are selected so that upon combination with each other and upon subsequent decomposition in an oxidizing atmosphere inorganic oxides will form in definite proportions which combine in either a crystalline state or an amorphous or glassy state. What determines which state is obtained, of course, depends upon the oxides selected for combination with one another and the temperature to which the substrate is heated. The substrate may be heated or fired to a peak temperature of 1,930° F., the melting point of gold. Therefore, the particular oxides selected which can combine with each other in the amorphous state at or below 1,930° F. will do so if the substrate is fired to this peak or to a lower particular glass-forming temperature. However, it may be desirous to combine the inorganic oxides in the crystalline state and so the oxides may be selected from those which combine in the crystalline state even up to the peak temperature of 1,930° F. The oxides chosen and the temperatures employed to obtain either an amorphous state or a crystalline state are well known to those skilled in the ceramic art and are readily ascertainable.

The concentration of the gold resinate and the oxide-forming resinates are selected so that upon application to the substrate and upon decomposition of the resinate mixture the resulting gold film will comprise 72 to 99 percent by weight of gold and 1 to 28 percent by weight of combined oxides. Less than 1 percent by weight of combined oxides does not lead to very good adhesion of the gold film to the substrate; however, less than 72 percent by weight of gold leads to a discontinuous layer of gold which does not lend itself for subsequent electrodeposition thereupon. The concentrations of the gold resinate to the oxide-forming resinates that will give the above optimum range of gold to combined oxides has been found to be from 3.69 to 71.81 parts by weight of gold in the form of a resinate to one part by weight of oxide-forming resinates where a lead silicate glass, composed of 25% $SiO_2$ and 75% PbO, is formed. Where a lead borosilicate glass, composed of 31 % $SiO_2$, 25% $B_2O_3$ and 44% PbO, is formed, the concentration has been found to be 7.17 to 153 parts by weight of gold in the form of a resinate to 1 part by weight of oxide-forming resinates. It is understood, the optimum concentration of gold resinate to inorganic-oxide forming resinates will vary with the oxide system selected.

The desired thickness of the film is important since, if the adherent film is too thin, it will have insufficient conductivity for subsequent electroplating upon it. If on the other hand the adherent film is too thick, the film does not fire smoothly and tends to blister. The adherent film should have a thickness in the range of 1,000 to 5,000 A. The optimum thickness has been found to be 3,000 A where the film was deposited on a glass substrate.

The first step in the practice of the present invention typically involves cleansing the surfaces of the substrate. This end may suitably be attained by detergent washing, etching, abrasive polishing or solvent degreasing.

The mixed resinate solution is applied to the substrate in any pattern desired by any one of a number of standard procedures such as brushing, dipping, spin coating, spraying, roller coating, decalcomania transfer or printing, which includes screen printing, offset printing and printing with rubber dies. After suitable application of a film of a mixed resinate solution to the substrate, the substrate is permitted to dry in circulating, heated air. The thinners or solvents contained in the mixed resinate solution are driven off and a mixed resinate coating remains.

Following the drying step, the coated substrate is placed in a furnace and heated in air or in an oxidizing atmosphere. The temperature at which the substrate is heated is one which has to be sufficient to (1) decompose the various resinates, i.e., to decompose the gold resinate to form free gold and to decompose the remaining resinates to form inorganic oxides; (2) combine the resultant inorganic oxides with one another into either a crystalline or an amorphous state; and (3) combine the thus formed in situ combined oxides with the free gold to form an adherent gold film on the substrate.

The temperature employed is in the range of 800° to 1,930° F. and as indicated above, whether or not the oxides combine in the crystalline state or the amorphous state is dependent on the oxides chosen and the temperature within the above range to which the substrate is heated. The time parameters for the coated substrate will, of course, depend upon the temperature chosen and the particular oxides selected to be combined with the free gold to form the adherent film. These time-temperature parameters are, however, readily ascertainable experimentally by one practicing the invention and one skilled in the art can devise a number of suitable time-temperature schedules. In this regard, it should be noted that where the oxides are combined to form a glass, the temperature to which the substrate is heated must not be so low as to result in failure to achieve the desired continuous amorphous phase and must not be so high as to produce undesired bubbles or blisters.

It is preferred to fire the substrate on a three phase firing cycle. Prior to firing the substrate, it is placed in a conventional drying oven to partially remove the thinners, leaving the coating in a tacky condition. This tacky film can, however, withstand normal handling without marring or blemishing. The substrate is then placed in a conventional furnace or kiln and heated up to 400° F. at which point it is held for approximately 15 minutes to insure that all of the thinners have been removed. The temperature is then raised to at least 800° F. for 30 to 60 minutes in order to insure complete decomposition and removal of carbonaceous matter. If necessary, the furnace temperature is raised to a third firing stage in order to combine the oxides. This peak temperature will, of course, depend upon the oxides chosen.

After the substrate has been heat-treated to form a continuous adherent gold film, the substrate is cooled to room temperature at such a rate as to reduce the amount of stress formed in the substrate and the glassy or crystalline matrix. The substrate may then be placed in a standard gold electroplating bath and additional gold may be electroplated onto the existent gold film until the desired thickness is obtained. For electrical purposes, this thickness is typically within the range of 12,000 to 50,000 A.

An optional stress relieving heating step may be performed after plating in order to further strengthen the bond of gold to the substrate. The time-temperature parameters of this stress relieving step will, of course, be dependent upon the substrate and the combined oxide system chosen. These are variable parameters which are readily ascertainable experimentally to one practicing the invention, and one skilled in the ceramic art can devise a number of time-temperature schedules. Typically, for a gold coated substrate having a lead borosilicate glass, containing 31% $SiO_2$, 25% $B_2O_3$, and 44% PbO, combined with the gold, the substrate is heated to a temperature of 1,200° F. over a period of 30 to 60 minutes.

The invention will be understood fully from the following description of the specific embodiments of the invention which are presented for the purpose of illustration only and not to limit the scope of the invention as defined in the annexed claims. One specific mixture that was employed in forming an adherent gold film was the following:

I.

1. 8 parts by weight of a gold resinate solution containing 20 percent by weight of gold in resinate form, obtained from commercial sources;
2. 0.333 part by weight of a silicon resinate solution containing 9.3 percent by weight of silicon in resinate form, obtained from commercial sources;
3. 0.667 part by weight of a lead resinate solution containing 27.8 percent by weight of lead in resinate form, obtained from commercial sources.

The above constituents were thoroughly mixed and the resultant resinate mixture was applied to a 2 by 2 inch, 99.5 percent alumina ceramic substrate by spin coating, from a flooded start, at 490 rpm for 30 seconds. The spin-coated substrate was air dried at 160° F. in a drying oven for one hour to partially remove the thinners and form a tacky coating, whereafter the substrate was inserted in a furnace and air fired to 400° F. for 15 minutes to remove all of the thinners. The substrate was then air fired to a temperature of 800° F. for 30 minutes to decompose the resinates to form free gold and the oxides of silicon and lead. The temperature was raised to 1,400° F. to combine the oxides into a lead-silicate glass (25% $SiO_2$, 75% PbO), which in turn combines with the free gold to form an adherent gold film composed of 14 percent by weight of glass and 86 percent by weight of gold. The substrate was then allowed to cool slowly through normal radiation (2 hours) to 400° F. whereupon it was removed from the furnace.

II. A second specific mixture that was employed in forming the adherent gold film was the following:

1. 32 parts by weight of a gold resinate solution containing 20 percent by weight of gold in resinate form, from commercial sources;
2. 0.210 part by weight of a silicon resinate solution containing 9.3 percent by weight of silicon in resinate form, from commercial sources;
3. 0.608 part by weight of a boron resinate solution containing 1.5 percent by weight of boron in resinate form, from commercial sources;
4. 0.190 part by weight of a lead resinate solution containing 27.8 percent by weight of lead in resinate form, from commercial sources.

The above constituents were thoroughly mixed and the resultant mixture was applied to a 2 by 2 inch, 96 percent silica glass substrate by spin coating, from a flooded start at 610 rpm for 30 seconds.

The liquid-film coated substrate was dried at 160° F. for one hour to partially remove the thinners. The substrate was then air fired to a temperature of 400° F. for 15 minutes to remove all traces of the thinners whereafter the temperature was raised to 800° F. for 30 minutes to decompose the resinate mixture to form free gold and the oxides of silicon, boron and lead. The temperature was raised to 1,600° F. to combine said oxides to form a lead borosilicate glass (31% $SiO_2$, 25% $B_2O_3$, 44% PbO). The resultant glass is dispersed throughout the free gold to form an adherent gold film on the substrate which is composed of 2 percent by weight glass and 98 percent by weight gold. The substrate was allowed to slowly cool through normal radiation (2 hours) to 400° F. whereupon it was removed from the furnace. Additional gold was electroplated on the gold coated substrate employing a conventional gold citrate plating bath whereafter the substrate was refired to 1,200° F. to improve the adhesion of the resultant plated gold film to the substrate. After reaching 1,200° F., the substrate is allowed to cool slowly through normal radiation to room temperature (3 hours).

What is claimed is:

1. A method for the deposition of a continuous adherent gold film upon the surface of a substrate member which comprises the steps of (a) preparing a mixture of organic resinates comprising a gold resinate and at least two resinates selected from the group consisting of lead resinate, silicon resinate and boron resinate, (b) coating the surface of the substrate with said mixture, and (c) heating the coated substrate to a temperature within the range of 800° to 1,930° F., so resulting in the decomposition of said mixture and the formation of free gold and inorganic oxides which combine in situ to yield an adherent continuous gold film on the substrate.

2. The method as defined in claim 1 wherein the adherent gold film comprises 72 to 99 percent by weight of gold and 1 to 28 percent by weight of combined oxides.

3. The method as defined in claim 1 wherein said oxides combine to form a glass film in situ on the surfaces of the substrate.

4. The method as defined in claim 3 wherein the adherent gold film comprises 72 to 99 percent by weight of gold and 1 to 28 percent by weight of glass.

5. The method as defined in claim 3 wherein:

said organic resinates consist of a lead resinate and a silicon resinate; and wherein said glass film is a lead silicate glass film.

6. The method as defined in claim 3 wherein:

said organic resinates consist of a lead resinate, a silicon resinate and a boron resinate; and wherein said glass film is a lead borosilicate glass film.

* * * * *